United States Patent [19]
Pyhälammi et al.

[11] Patent Number: 5,671,224
[45] Date of Patent: *Sep. 23, 1997

[54] METHOD FOR INTERCONNECTING LOCAL AREA NETWORKS OR NETWORK SEGMENTS AND A LOCAL AREA NETWORK BRIDGE

[75] Inventors: Seppo Pyhälammi; Olli-Pekka Lintula, both of Helsinki; Antti Kokkinen, Kirkkonummi, all of Finland

[73] Assignee: Nokia Telecommunications Oy, Espoo, Finland

[*] Notice: The term of this patent shall not extend beyond the expiration date of Pat. No. 5,541,922.

[21] Appl. No.: 416,682
[22] PCT Filed: Oct. 1, 1993
[86] PCT No.: PCT/FI93/00394
  § 371 Date: May 15, 1995
  § 102(e) Date: May 15, 1995
[87] PCT Pub. No.: WO94/08412
  PCT Pub. Date: Apr. 14, 1994

[30] Foreign Application Priority Data

Oct. 5, 1992 [FI] Finland ................ 924480
Oct. 5, 1992 [FI] Finland ................ 924481

[51] Int. Cl.⁶ ............ H04L 12/28; H04B 7/212; H04J 3/16
[52] U.S. Cl. ............ 370/401; 370/470; 370/444
[58] Field of Search ............ 370/85.13, 85.6, 370/85.14, 94.1, 28, 401, 440, 444, 455, 462, 463, 470, 911

[56] References Cited

U.S. PATENT DOCUMENTS 4,866,709  9/1989  West et al. ................ 370/82
4,922,503  5/1990  Leone ................ 370/85.13
5,060,228  10/1991  Tsutsui et al. ................ 370/85.13
5,088,090  2/1992  Yacoby ................ 370/85.13
5,111,453  5/1992  Morrow ................ 370/85.13
5,151,897  9/1992  Suzuki ................ 370/85.13
5,168,495  12/1992  Smith ................ 370/85.6
5,268,900  12/1993  Hluchyj ................ 370/85.6
5,307,345  4/1994  Lozowick ................ 370/85.13
5,541,922  7/1996  Pyhalammi ................ 370/82

FOREIGN PATENT DOCUMENTS 0365337  4/1990  European Pat. Off.
0473066  3/1992  European Pat. Off.
9213413  8/1992  WIPO

OTHER PUBLICATIONS

Jaakonmäki "LÄHIVERKKO-OPAS", 1991, pp. 18–23.
Grimshaw, "LAN Interconnections Technology", LAN TECHNOLOGY TELECOMMUNICATIONS, Feb. 1991, pp. 25–32.

Primary Examiner—Hassan Kizou
Assistant Examiner—A. Bnimoussa
Attorney, Agent, or Firm—Cushman Darby & Cushman Intellectual Property Group of Pillsbury Madison & Sutro LLP

[57] ABSTRACT

A method for interconnecting local area networks or network segments by means of a bridge. In the method, a local area network frame is received at the bridge and forwarded across the bridge if its destination address refers to a network or network segment on the other side of the bridge. In order that a bridge simple in structure can be utilized in cases where priority is to be assigned to terminal traffic over datafile transfer traffic, the length of the frame to be forwarded is determined for classification into a respective one of at least two categories, by length, and the obtained length classifications are utilized in the transmission of the frames for assigning priority to at least some of the shorter frames over the longer frames.

6 Claims, 4 Drawing Sheets

METHOD FOR INTERCONNECTING LOCAL AREA NETWORKS OR NETWORK SEGMENTS AND A LOCAL AREA NETWORK BRIDGE

BACKGROUND OF THE INVENTION

The invention relates to a method for interconnecting local area networks or network segments, and to a local area network bridge A local area network (LAN) is a local data network taking care of traffic between workstations connected to it, such as PCs, and various devices providing services to the workstations. A basic LAN configuration comprises a physical transmission path, i.e. cabling, a network server, workstations connected to the cabling by means of adapter cards, and a network software. A LAN is typically located in a single building or in several buildings located close to each other, e.g. at one office of a specific organization or company. Recently, however, there has been an increased demand to interconnect individual LANs into larger networks. For such purposes, the above-described basic components will not suffice.

Equipments required to interconnect LANs are typically classified in accordance with the OSI (Open Systems Interconnection) model of the ISO (International Standards Organization). The OSI model aims at creating a framework for standards applied in data transmission between open systems. The model comprises seven superimposed layers the tasks of which have been specified whereas their implementation has been left open. The OSI model is described more closely e.g. in Reference [1] (of the references are listed at the end of the specification).

The devices used in the interconnection of LANs, i.e. the repeater, the bridge, and the router, will be described in short below.

The repeater is the simplest means used in the interconnection of LANs or LAN segments. The repeater operates on the lowest OSI layer (layer 1), i.e. on the physical layer. The repeater amplifies the bit stream and forwards all traffic over it from one network segment to another. The repeater is thus used to increase the physical length of the network, and it can be used only when the networks to be interconnected are fully identical (or differ only in the transmission medium). Segments interconnected by the repeater form a single logical network.

The bridge operates on the next OSI layer (layer 2), i.e. on the data link layer. Even though the data link layer is mainly independent of the physical transmission medium used, some of its functions, however, are dependent on the physical transmission medium. For this reason, the data link layer includes a so-called MAC (Media Access Control) sublayer in some network architectures. The MAC sublayer provides access to the transmission path, i.e. it takes care of functions most probably associated with the characteristics of the physical transmission path. Bridges typically operate on the MAC sublayer. The function of the bridge is to monitor frames transferred over the LAN and to transfer them from one network to another on the basis of the physical address of the data packets. Only frames having a destination address indicating transmission to the side of the other network are able to cross the bridge. The bridge thus acts as an insulator which reduces the load in other network portions. The bridge does not analyze more closely what the frames transport and it ignores the higher-level protocol transferred in the frames. In other words, the bridge is protocol-independent, and so it can be used to interconnect networks utilizing protocols of different types (TCP/IP, XNS, OSI, NetBios, etc.).

The bridge contains a so-called routing table, which is updated by the bridge on the basis of the addresses of the transmitting parties of frames received by the bridge. The routing table indicates to the bridge behind which interface a specific station is currently located. In other words, the bridge is able to "learn" station locations so that new stations can be added to the network without having to reconfigure the bridge.

The router operates on the third OSI layer, i.e. on the network layer. Routers know the higher protocols used in the LAN traffic and route messages by means of the addressing mechanisms of these protocols. The router forwards the frame (to another router or to a destination station) on the basis of the data obtained from the network address routing table. The router calculates an optimal route for each frame. The maintenance of routing data and the route selection are based on a routing protocol utilized by the router (such as RIP, Routing Information Protocol). The filtering and management properties of routers are superior to those of bridges, and they offer better possibilities for the construction and use of complicated LAN configurations.

The bridge and the router are described e.g. in Reference [2], which is referred to for a more detailed description.

The different ways presently in use for the interconnection of LANs can be classified roughly into two types, depending on whether the interconnection is performed by the bridge or by the router.

In practice, the above-described ways of interconnection are both needed; the bridge, however, is used in the first place, if there are no special requirements necessitating the use of the router. Generally speaking, the bridge is a convenient means for the interconnection of LANs. As it is transparent to the traffic and suitable for use with protocols of different types, it is advantageous in installation and structure; its costs are low and it can be installed rapidly without any particularly high professional skill.

However, the bridge cannot be used in a case to be described more closely below.

At present, LAN traffic can be considered to consist of traffic of two types: terminal user traffic and datafile transfer traffic. Terminal traffic has a high interactivity requirement as it provides services directly to LAN users (very often less patient). On the contrary, the transfer of datafiles mainly consists of inter-equipment transfer traffic in which the interactivity requirement is considerably lower than in the terminal traffic. The terminal traffic should thus be forwarded rapidly over the LAN whenever such traffic occurs, whereas the datafile transfer rate could be reduced for the benefit of the terminal traffic. From the viewpoint of the rate requirements, problems are caused especially at sites where traffic from a rapid LAN has to be packed into a considerably slower subscriber interface. This requires buffering which causes delays. FIG. 1 illustrates the transmission delay of a single LAN data packet over a subscriber interface at two different frame lengths (100 and 1,000 bytes) and at different subscriber interface rates. As appears from the figure, the transmission of a single frame of a typical size (1 kbyte) e.g. at 64 kbit/s takes about 100 ms. There are typically a plurality of such frames in succession, each one of which has to be buffered if no information is to be lost. As a result, delays of the order of 1 second easily occur. However, interactive operation (such as terminal work) requires delays ranging between 100 and 300 ms in order that the work would be pleasant and efficient. If delays of the order of 1 second occur over a single subscriber link, the user has to tolerate a response time of the order of 4 seconds (a back-and-forth delay over two subscriber interfaces), which is far from the desired level.

A solution to the above-described problem is to use routers in the interconnection, which allows assignment of priority to terminal traffic over datafile transfer traffic when the applied protocols are known and suitable "identity codes" are identified. In this case, the router solution has to be relied on although the router is known to be more complicated in structure and more difficult to control.

SUMMARY OF THE INVENTION

The object of the present invention is to provide an improvement in the above-described drawback and to introduce a method allowing a bridge to be utilized even in cases where terminal traffic is to be given priority over datafile transfer. This is achieved by means of a method according to the invention, which is characterized in that the length of the frame to be forwarded is determined with a predetermined accuracy, and the obtained length classification is utilized in the transmission of the frames for assigning priority to at least some of the shorter frames over the longer frames. The bridge according to the invention, in turn, is characterized in that it comprises means for classifying frames to be forwarded across the bridge on the basis of their length into at least two length categories each having a respective priority status; means for comparing the source and destination addresses of a frame to be passed across the bridge with the corresponding addresses of frames already placed in the transmission queue and having a lower priority status than said frame; and at least two buffers dividing the frames to be passed across the bridge on the basis of the length classification and address checking into at least two transmission queues having different priority statuses.

The idea of the invention is that a priority procedure based on the length of frames to be bridged is incorporated in a bridge having simple structure as such so as to be able to assign the terminal traffic priority over the datafile transfer traffic.

The solution according to the invention enables a simple LAN bridge to operate partly similarly as a considerably more complicated router. The router may thus be replaced in many cases with a bridge according to the invention, and so both the original equipment and installation costs as well as the later management costs will be reduced.

BRIEF DESCRIPTION OF THE DRAWINGS

In the following the invention will be described in more detail with reference to FIGS. 2 to 6 in the examples illustrated in the attached drawings, in which.

DETAILED DESCRIPTION

Figure 1:
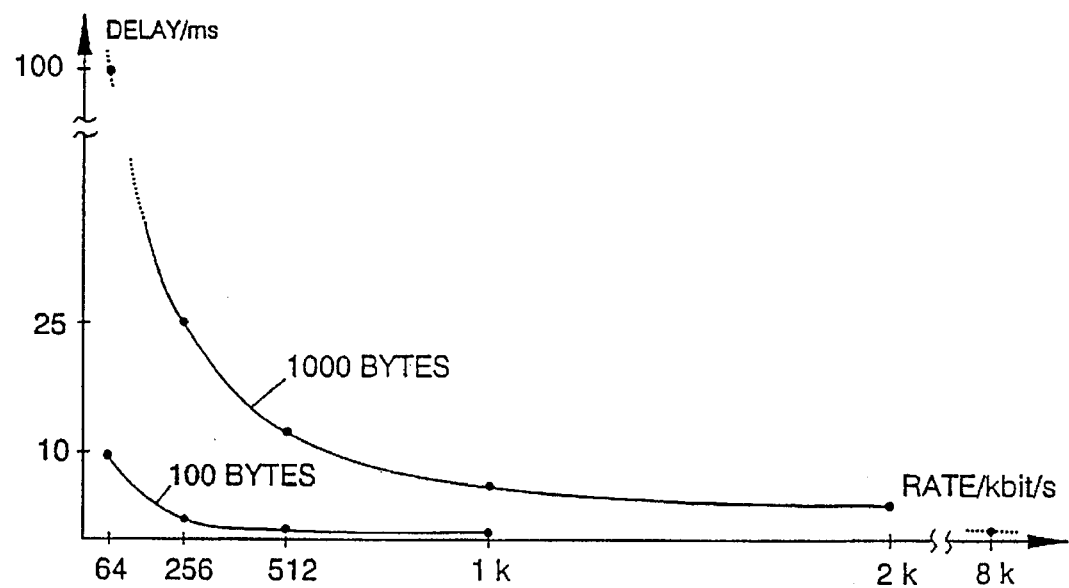
FIG. 1 illustrates the transmission delay of a single LAN frame over a subscriber interface at two different frame lengths and at different subscriber interface rates.
Figure 2:
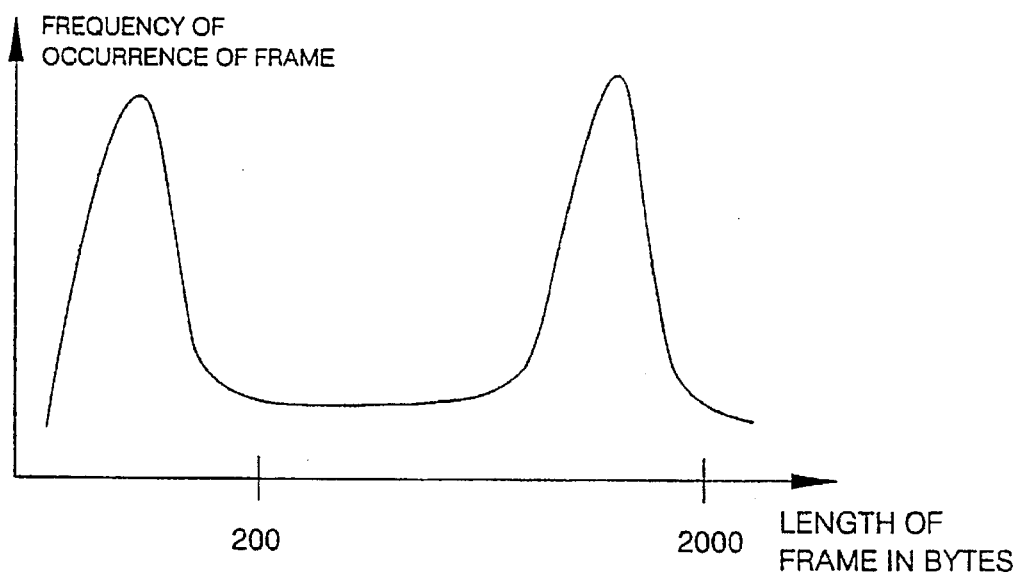
FIG. 2 illustrates a typical LAN traffic profile as a function of the frame length.

FIG. 2 illustrates a typical LAN traffic profile. The vertical axis represents the frequency of occurrence and the horizontal axis the frame length in bytes. As appears from the figure, the traffic profile comprises two distinctive peaks. The peak occurring at the smaller frame length is created mostly by terminal traffic containing e.g., commands from the keyboard and updating of the display screen. The shorter the procedure, the more rapid a response is expected. The peak occurring at the greater frame length, in turn, is created by the datafile transfer traffic, in which datafiles are transferred in packets as large as possible.

Figure 3:
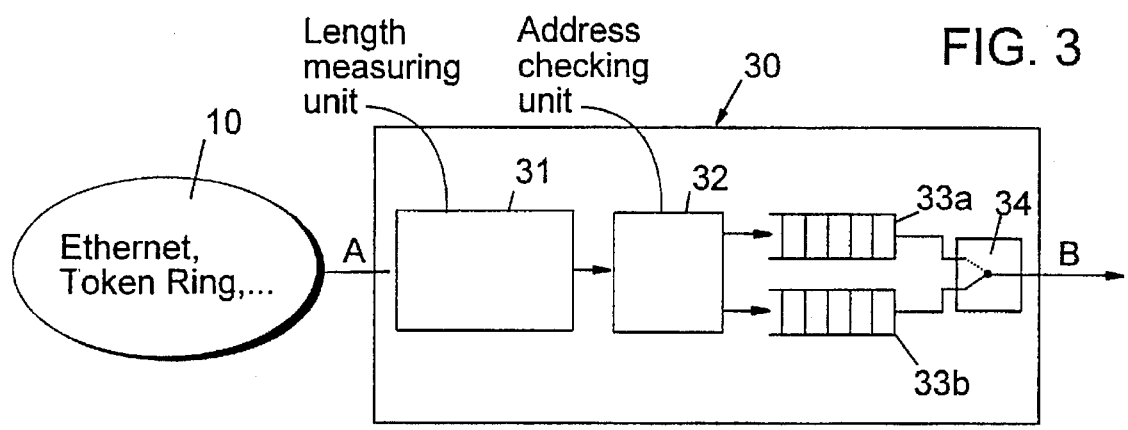
FIG. 3 is a block diagram illustrating a bridge according to the invention.

The present invention utilizes the above LAN traffic profile. As shown in FIG. 3, this is done by utilizing a bridge 30 known per se in the interconnection. According to the invention, the bridge is further provided with means for classifying frames to be forwarded according to their length into (at least) two categories; means for analyzing the source and destination addresses of the frame to be bridged; and (at least) two buffers for buffering frames on the basis of the length classification and address checking into a queue of priority frames and a queue of non-priority frames.

The limit value used in the frame length classification may be e.g. 200 bytes as shown in FIG. 2. This means that frames having a length below 200 bytes probably represent terminal traffic while those having a length above 200 bytes probably represent datafile transfer traffic. A frame to be bridged is received from a LAN 10 (which may be any known LAN, such as an Ethernet, Token Ring or FDDI network) by the bridge 30 in its length measuring unit 31, where the frame length classification takes place by reading the length of the frame from the frame length field (e.g. from the LENGTH field in an Ethernet frame).

In order to ensure that the mutual order of packets transmitted from the same source address to the same destination address will not change, an address checking unit 32 is added after the length measuring unit. The address checking unit has two outputs: a buffer 33a for priority frames is connected to one output and a buffer 33b for non-priority frames is connected to the other output. The buffers are connected to a switching means 34, which forwards the frames to the output of the bridge (to another network or network segment) so that the frames in the buffer 33a are processed prior to the frames in the buffer 33b.

For the sake of clarity, only portions essential to the invention are shown in FIG. 3. In other respects the bridge according to the invention corresponds to the prior art technique. Bridges are typically classified on the basis of the routing algorithms they utilize. An essential feature of the bridge is, however, that it comprises two interfaces (A and B in FIG. 3) and means for analyzing the physical address of the frame (the OSI layer 2). It is further to be noted that the method according to the invention is applied only to LAN frames which the bridge has authenticated and the destination address of which refers to a network or network segment on the other side of the bridge.

Figure 4:
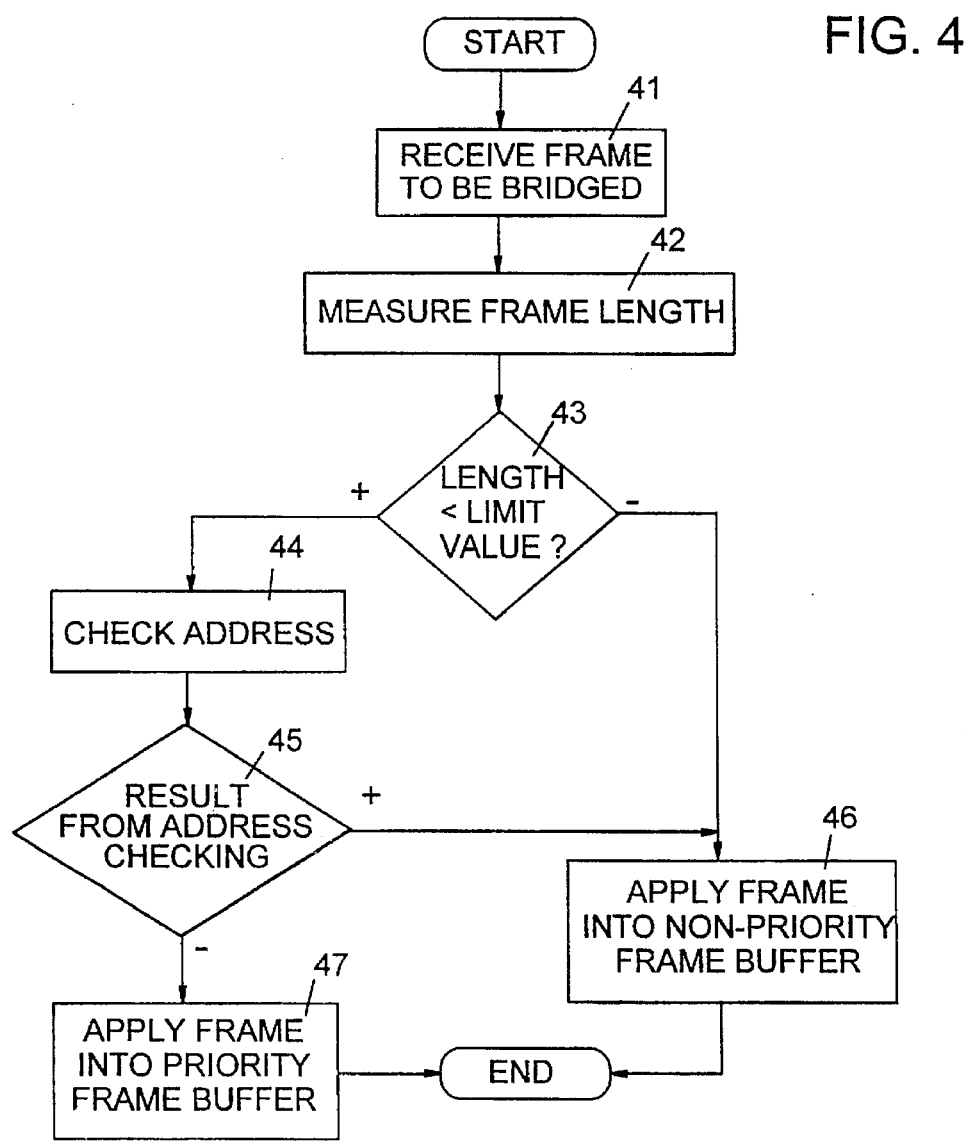
FIG. 4 is a flow diagram illustrating the priority operation performed by a bridge according to the invention.

FIG. 4 is a block diagram illustrating the assignment of priorities by the bridge according to the invention. In step 41 a frame to be bridged is received in the length measuring unit 31, which reads the length from the respective field of the frame (step 42). The obtained length is compared with a predetermined limit value (such as 200 bytes) in step 43. If the obtained length is equal to or smaller than the limit value, the frame is applied to the address checking unit 32, where the addresses contained in the frame are checked (step 44). If it is found (step 45) that the result of the address checking is positive, the frame is applied from the address checking unit to the non-priority frame buffer 33b (step 46). If the result of the address checking is negative, the frame is applied from the address checking unit to the priority frame buffer 33a (step 47).

On the other hand, if it is found out in step 43 that the frame length exceeds the predetermined limit value, the frame is applied directly through the address checking unit (without address checking) to the non-priority frame buffer 33b.

Figure 5:
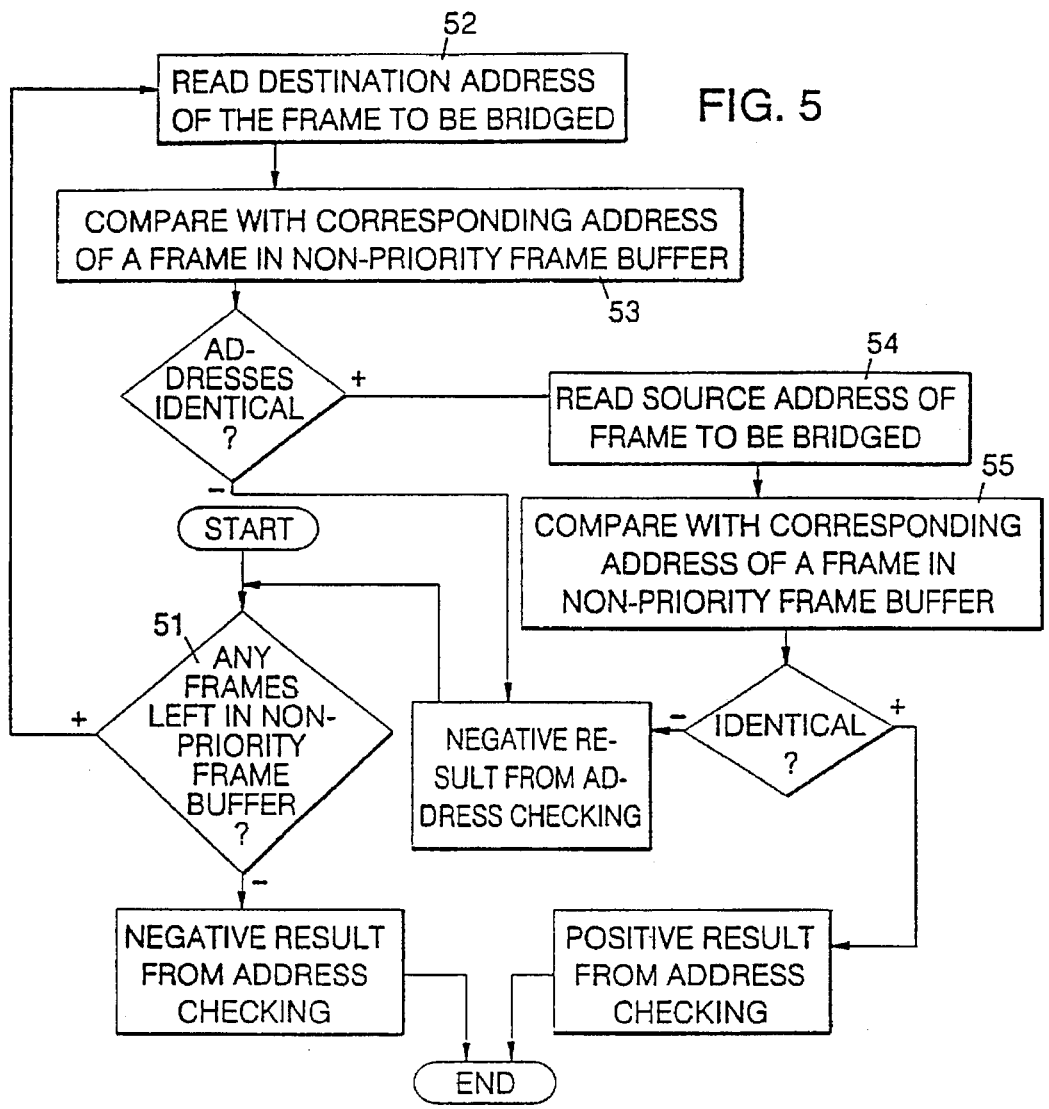
FIG. 5 is a flow diagram illustrating an address checking operation included in the priority operation performed by the bridge.

The above-described address checking for short frames will be described more closely with reference to the block diagram of FIG. 5, which illustrates the operation of the address checking unit 32. At the start (step 51) it is checked whether there are frames queuing in the non-priority frame buffer 33b. If there are no frames, the result of the address checking is negative, and the frame is applied to the priority frame buffer 33a, as described above. If there are still frames in the queue of non-priority frames, the address of the receiving party (destination address) of the frame to be bridged is read in step 52, whereafter the address is compared with the corresponding address of a frame in the queue of non-priority frames (step 53). If the addresses are identical, the address of the transmitting party (source address) is also read from the frame to be bridged in step 54. This address is compared with the corresponding address of the frame in the non-priority queue (step 55). If these addresses are also identical, the result of the address checking is positive, and so the frame is applied into the non-priority frame buffer 33b, as described above. If the comparisons in steps 53 or 55 show that either the source addresses or destination addresses deviate from each other, the result of the address checking is negative, and the frame is applied to the priority frame buffer 33a, as described above. One then returns to the start, and the processing is continued for the next frame in the queue of non-priority frames, if there are any frames left in the queue.

Accordingly, short frames are fed mainly to the priority frame buffer 33a. However, if the non-priority frame buffer already contains a frame in which the pair of the source and destination address corresponds to the pair of the source and destination address of the short frame, the short frame is applied to the non-priority frame buffer. In this way, it can be ensured that the order of packets sent from the same transmitting party to the same receiving party will not change.

Figure 6:
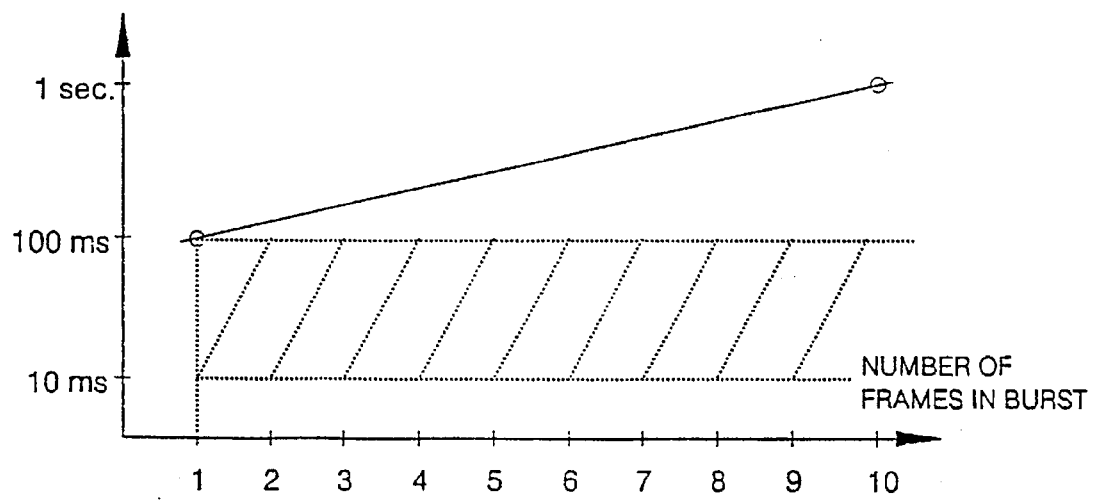
FIG. 6 illustrates resulting delays as a function of the size of the frame burst both in a solution according to the invention and in a prior art solution.

The advantage to be obtained by the solution according to the invention is significant. FIG. 6 illustrates the transmission of frames 1,000 bytes in length over a 64 kbit/s link (the upper line). The vertical axis represents the resulting delay, and the horizontal axis represents the number of frames in the burst. Each frame causes a delay of about 100 ms, and if the burst consists of n frames, the delay is n-fold (the upper line). In the solution according to the invention, short frames have priority over the queue of long frames, and the delay will readily be reduced at least to one tenth (the lined section). In practice, the delay varies as the transmission of a long frame possibly in progress has to be completed before a short frame can be transmitted.

The method and the LAN bridge according to the invention can be utilized e.g. for providing the customer with routing network services. Such services are usually realized by connecting the LAN of each customer via its own router to a public network acting as a backbone network. The public network may be any known packet switched network, i.e. a network capable of transmitting frames of variable length or of equal length. Such networks include the Frame Relay network known per se. Each router is located in the customer premises, and it is connected to a single node of the backbone network over a transmission line.

Figure 7:
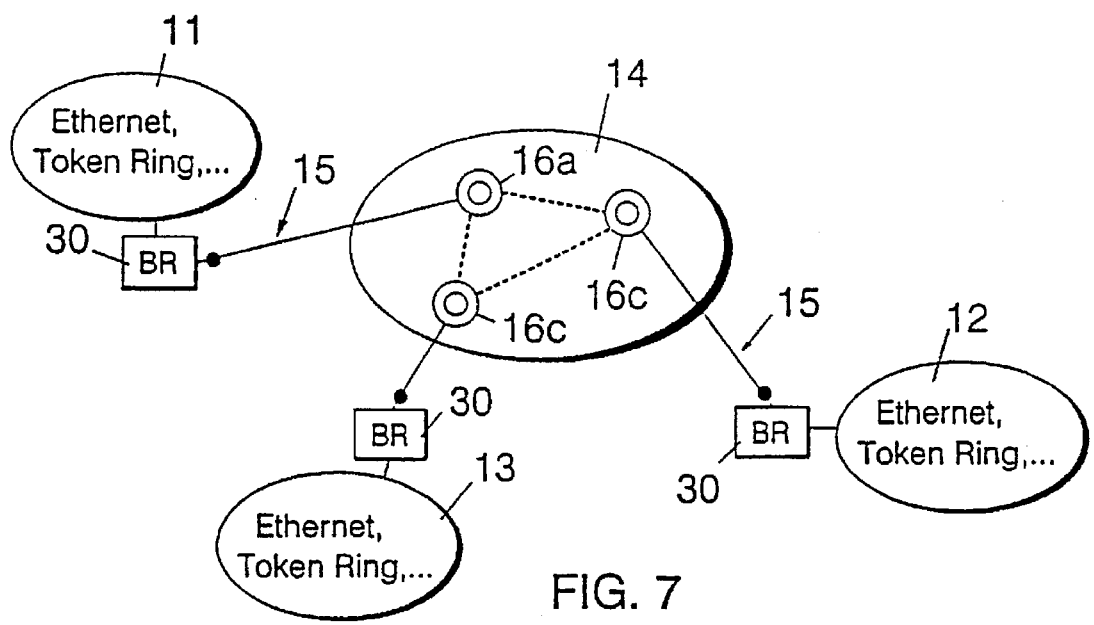
FIG. 7 illustrates the use of a LAN bridge according to the invention for providing routing services.

FIG. 7 illustrates the use of a LAN bridge according to the invention for providing routing services. A LAN bridge 30 according to the invention is located in each customer's premises. It connects a customer LAN 11, 12 or 13 (which may be any known LAN, such as an Ethernet, Token Ring or FDDI network) to a transmission line 15. Routing procedures are performed in a centralized manner in the public network 14 by utilizing routing software located in public network nodes 16a to 16c.

Figure 8:
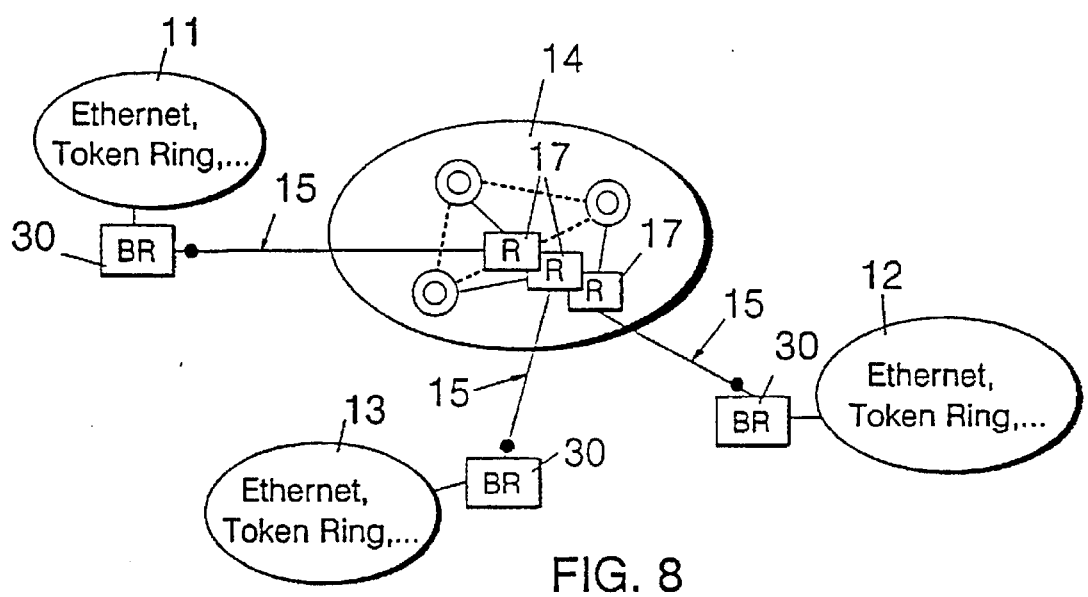
FIG. 8 illustrates an alternative way of providing routing network services.

FIG. 8 illustrates an alternative for the network arrangement shown in FIG. 7. A LAN bridge 30 according to the invention is located in each customer's premises. It connects a customer LAN 11, 12 or 13 to a transmission line 15. Routing procedures are also here performed in a centralized manner in a public network 14 but the transmission line is now first connected to a customer-specific router 17, which takes care of the routing together with the routers of the public network or alternatively together with the other customer-specific routers 17.

Even a LAN interconnection by means of a bridge is often sufficient to be regarded as a service, and this service is provided by the bridges 30 together with the public network 14. However, routing interconnections are also needed (e.g. certain links). This kind of traffic is now passed entirely through the bridge 30 to the side of the public network, preferably to a (customer-specific or public) router located in a network node, which router provides the routing service together with the other (public or customer-specific) routers of the network. The customer-specific router 17, to which the bridge 30 is connected via the transmission line 15 may be located at a greater distance from the network node. It is, however, preferable to locate it in connection with the network node, so that it can be integrated in the node software and equipment.

When the LAN bridge according to the invention is used as described above for providing routing net-work services, the simple bridge advantageous in price can be located in the customer's premises. As compared with the router, the bridge is easy to install and maintain. Being protocol-independent, the bridge does not either have any updating problems when the protocols used in the networks change. Routers, in turn, are utilized efficiently on the side of the backbone network, where the required management and knowhow can be concentrated.

Even though the invention has been described above with reference to the examples shown in the attached drawings, it is obvious that the invention is not restricted to them, but can be modified within the scope of the inventive idea disclosed above and in the attached claims. For instance, the frames may be classified into more than two length categories.

References

[1] Leena Jaakonmäki: Lähiverkko-opas, Suomen Atk-kustannus Oy, 1991.

[2] Michael Grimshaw: LAN Interconnections Technology, Telecommunications, February 1991.

We claim:

1. A method for interconnecting local area networks or network segments by a bridge, comprising:

receiving local area network frames in the bridge and forwarding each across the bridge only if its destination address refers to a network or network segment on the other side of the bridge, classifying each frame to be forwarded as to its length, into a respective one of at least two different, and using the respective obtained length classifications in the transmission of the frames, for assigning priority to at least some of the frames which are shorter, over at least some of the remaining frames which are longer.

2. The method according to claim 1, wherein:
the frames are classified into two length categories.

3. The method according to claim 2, wherein:
a frame classified as short is assigned priority over the frames if there does not simultaneously occur a frame which has no priority and which is transmitted from a same transmitting party to a same receiving party as said frame classified as short.

4. The method according to claim 1, wherein:
a frame classified as short is assigned priority over other frames if there does not simultaneously occur a frame which has no priority and which is transmitted from a same transmitting party to a same receiving party as said frame classified as short.

5. A local area network bridge for the interconnection of local area networks or network segments, comprising:

two network interfaces and means for analyzing the physical address contained in each frame to be transmitted in a local area network, including:

means for classifying frames to be forwarded across the bridge on the basis of their length into at least two length categories each having a respective priority status;

means for comparing the source and destination addresses of each respective frame to be passed across the bridge with the corresponding addresses of frames already placed in a transmission queue and having a lower priority status than said respective frame; and at least two buffers dividing the frames to be passed across the bridge on the basis of the length classification and address checking, into at least two transmission queues having different priority statuses.

6. A method for providing routing network services, comprising:

interconnecting a plurality of customer-specific local area networks and a public network via a respective plurality of transmission lines, including connecting each local area network to the respective said transmission line by a respective bridge, and providing respective customer-specific routers for said transmission lines, each on the public network side of the respective bridge; and for each said local area network, receiving local area network frames in the respective bridge and forwarding each across the respective bridge only if its destination address refers to the respective local area network;

classifying each frame to be forwarded, as to its length, into a respective one of two different length categories; and using the respective obtained length classifications in the transmission of the frames, for assigning priority to at least some of the frames which are shorter over at least some of the remaining frames which are longer, a frame classified as short being assigned priority over other frames if there does not simultaneously occur a frame which has no priority and which is transmitted from a same transmitting party to a same receiving party as said frame classified as short.

* * * * *